(12) United States Patent
Xia

(10) Patent No.: US 9,389,409 B2
(45) Date of Patent: Jul. 12, 2016

(54) IMAGING SYSTEM FOR DIGITAL STEREO MICROSCOPE

(75) Inventor: Denghai Xia, Guangdong (CN)

(73) Assignee: GUANGZHOU JINGHUA OPTICAL & ELECTRONICS CO., LTD., Guangdong (CN)

( * ) Notice: Subject to any disclaimer, the term of this patent is extended or adjusted under 35 U.S.C. 154(b) by 370 days.

(21) Appl. No.: 14/125,309

(22) PCT Filed: Jun. 7, 2012

(86) PCT No.: PCT/CN2012/076574
§ 371 (c)(1),
(2), (4) Date: Feb. 20, 2014

(87) PCT Pub. No.: WO2012/171440
PCT Pub. Date: Dec. 20, 2012

(65) Prior Publication Data
US 2014/0240457 A1     Aug. 28, 2014

(30) Foreign Application Priority Data
Jun. 13, 2011    (CN) .......................... 2011 1 0156961

(51) Int. Cl.
*H04N 13/00*    (2006.01)
*G02B 21/36*    (2006.01)
(Continued)

(52) U.S. Cl.
CPC .......... *G02B 21/367* (2013.01); *H04N 13/0037* (2013.01); *H04N 13/0239* (2013.01); *G02B 21/22* (2013.01); *H04N 13/0029* (2013.01)

(58) Field of Classification Search
CPC ...................................................... G02B 21/36
See application file for complete search history.

(56) References Cited

U.S. PATENT DOCUMENTS

| 4,412,127 A * | 10/1983 | Imai ..................... | G02B 21/241 250/204 |
| 2003/0112507 A1* | 6/2003 | Divelbiss ............. | G02B 26/008 359/464 |

(Continued)

FOREIGN PATENT DOCUMENTS

| CN | 2860384 Y | 1/2007 |
| CN | 200952935 Y | 9/2007 |

(Continued)

OTHER PUBLICATIONS

International Search Report mailed Oct. 18, 2012 for priority application PCT/CN2012/076574.

*Primary Examiner* — Tracy Li
(74) *Attorney, Agent, or Firm* — Troutman Sanders LLP; Ryan A. Schneider

(57) ABSTRACT

An imaging system for digital stereo microscope is disclosed, wherein the system comprising two camera units with each camera unit comprises a lens and the two lenses of the two camera units are focused below the respective lens and optical axes of both lenses are arranged to focus at a same point; a main controller configured to provide both sensors with a common trigger signal for outputting image data and a common pixel reference clock signal for each sensor to generate its own pixel clock signal; a synchronous synthesizer for generating synthesized image data with left eye image data located on the left side and the right eye image data located on right side by synchronizing and synthesizing the left eye data and the right eye image data output by the respective sensor; the synthesized image data is compresses and encoded in the main controller to generate RGB image data corresponding to parallel image data; a stereoscopic display convertor for receiving the RGB image data and converting the received RGB image data into a format that is recognizable by a stereo display.

12 Claims, 3 Drawing Sheets

(51) Int. Cl.
*H04N 13/02* (2006.01)
*G02B 21/22* (2006.01)

(56) References Cited

U.S. PATENT DOCUMENTS

| | | | |
|---|---|---|---|
| 2003/0174203 A1* | 9/2003 | Takeno | H04N 5/2252 348/47 |
| 2004/0070667 A1 | 4/2004 | Ando | |
| 2007/0171944 A1* | 7/2007 | Schuijers | G10L 19/008 370/537 |
| 2007/0285793 A1* | 12/2007 | Liu | G02B 17/06 359/630 |
| 2010/0013947 A1* | 1/2010 | Oikawa | H04N 5/23212 348/222.1 |
| 2010/0053745 A1 | 3/2010 | Sander | |

FOREIGN PATENT DOCUMENTS

| | | |
|---|---|---|
| CN | 101266333 A | 9/2008 |
| CN | 201375505 Y | 1/2010 |
| CN | 101995668 A2 | 3/2011 |
| CN | 102226852 A | 10/2011 |
| JP | 10271532 A | 10/1998 |
| WO | 9514252 A1 | 5/1995 |

\* cited by examiner

IMAGING SYSTEM FOR DIGITAL STEREO MICROSCOPE

BENEFIT CLAIMS

This application is a US National Stage of International Application No. PCT/CN2012/076574, filed 7 Jun. 2012, which claims the benefit of CN 201110156961.8, filed 13 Jun. 2011. Each application is hereby incorporated in its entirety as if fully set forth herein.

TECHNICAL FIELD

The present invention relates to digital stereo microscopes, and in particular relates to imaging system of a digital stereo microscope which can be widely used in areas such as manufacturing, researching, medication, and education.

BACKGROUND ART

All of today's stereo microscopes are optical microscopes which observe object through binocular eyepiece. These optical microscopes can be difficult to operate and in extreme cases even cannot observe any image for an inexperience person. Chinese Patent No CN201740916U published on Feb. 9, 2011 discloses a stereo microscope which consists of a double eye observing device, a parallel light stereo zoom lens body having focusing and supporting rack, a stereo digital body, and a digital display device. In this microscope, a reflective component is inserted into a branch path of the stereo microscope, through which images are formed on the image sensor of the stereo digital body and are then provided to the digital display device.

In addition, Chinese patent no CN201145766Y published on Nov. 5, 2008 discloses a stereo imaging system for a surgical microscope. In this microscope two images with certain phase difference are captures by two camera devices synchronously. These images are printed on each side of each picture and then a same stereo vision as that for the patient under the lens is acquired using a convex lens. In this microscope, synchronized imaging is achieved by operating the camera shutters at the as time. It has been proved however, synchronization in this manner is very difficult to achieve in practice. Moreover, the stereo vision is achieved by a convex lens which also demands high operation technique in practice and is not suitable for naked eyes stereo image display.

SUMMARY OF THE INVENTION

One object of the invention is thus directed to provide an imaging system for digital stereo microscope which is able to display stereo images for naked eyes instead of observing the object through binocular eyepiece.

In one technical solution proposed by the present invention, an imaging system for digital stereo microscope is provided which comprises two camera units with same optical magnification arranged respectively for the left eye and the right eye of a human being, each camera unit comprises a lens, a sensor for imaging, and a microcontroller for controlling and configuring the sensor. The two lenses of the two camera units are focused below the lens and optical axes of two lenses are configured to converge to a same point;

The imaging system further includes:

a main controller which is configured to send instructions to the respective microcontroller for configuring and controlling the sensor arranged for each microcontroller; and to provide both sensors with a common trigger signal for outputting image data and a common pixel reference clock signal for each sensor to generate its own pixel clock signal;

a synchronous synthesizer for generating synthesized image data with left eye image data located on the left side and right eye image data located on the right side by synchronizing and synthesizing the left eye image data and the right eye image data output by the respective sensors. The synthesized image data is then compresses and encoded in the main controller to generate RGB image data corresponding to the synthesized image data;

a stereo display that receives and displays image data, and a stereoscopic display convertor for receiving the RGB image data and converting the received RGB image data into a format that is recognizable by the stereo display.

In some preferred embodiments, the included angle between the two optical axes is equal to or less than 18 degrees.

In some preferred embodiments the stereoscopic display convertor comprises a stereo format convert module for converting the received RGB image data into an interlaced format. An output of the stereo format convert module is electrically coupled to a LCD interface of stereoscopic display convertor, and the stereo display is communicatively connected to the stereoscopic display convertor via the LCD interface.

It is preferable that the stereoscopic display convertor includes a stereo format convert module for converting the received RGB image data to an interlaced format, and a LCD interface driver module, the image data in the interlaced format generated by the stereo format convert module can be input to the LCD interface driver module. An output of the LCD interface driver module is electrically coupled to the LCD interface of the stereoscopic display convertor.

It is preferable that the main controller provide a chip selecting signal to the microcontroller in each of the camera units to select the microcontroller that is to execute the instructions sent by the main controller.

In some preferred embodiments, the synchronous synthesizer comprises two memory units, i.e. a left memory unit and a right memory unit, arranged for the respective camera units, two write control modules i.e. a left write control module and a right write control module, arranged for the respective memory unit, a read control module and an output select module. Both of the left memory unit and the right memory unit can be asynchronous double port memory that perform read out and write in operation asynchronously. The left eye image data and the right eye image data output by the sensors are transferred to the left eye write control module and the right eye write control module respectively and are then written at the control of the left eye write control module or the right eye write control module into the respective left memory unit or the right memory unit, wherein, the horizontal and vertical synchronization signals and the pixel clock signal provided by the left write control module and the right write control module are identical to the respective horizontal and vertical synchronization signals and the pixel clock of the two sensors.

The left eye image data and right eye image data are read out by the output selection module from the left memory unit and the right memory unit and are synthesized during the read out process to form the synthesized image data. In this process, the read control module provides the output selection module with the horizontal and vertical synchronization signals and the pixel clock that is of the same frequency as the horizontal and vertical synchronization signals and pixel clock for controlling the write in process, and the pixel clock for controlling the read out process is configured to allow the output selection module to read out one row of data from both of the sensors and synthesis them in a new data row within one row cycle for controlling the read out process.

In some preferred embodiments, the synthesized image data is generated through full resolution parallel synthesis by the output selection module under control of the read control module; wherein, the frequency of the pixel reference clock signal for controlling the read out process is twice the frequency of the pixel clock signal of the sensor for the left eye or the right eye.

It is preferable that the pixel clock signal of the sensor is input to the read control module via a phase locked loop and the pixel clock for controlling the read out process is generated as a result.

Alternatively, the synthesized image data is generated through half resolution parallel synthesis by the output selection module under control of the read control module; wherein the frequency of the pixel reference clock signal for controlling the read out process equals to the frequency of the pixel clock single of the sensor for the left eye or the right eye.

It is preferable that the horizontal and vertical synchronization signals of a sensor are input to the read control module through a delay module to generate the horizontal and vertical synchronization signals for controlling the read out process in the read control module.

It is preferable that the output selection module read out, within a row cycle for controlling read out, the rows to be read out in the left memory unit and the right memory unit from at least a different start point or an end point to eliminate horizontal parallax between the left eye image data and the right eye image data.

It is preferable that horizontal parallax between the left eye image data and the right eye image data output by the respective camera unit is adjusted by the output selection module during read out by reading out the required rows from the left eye image data and the right eye image data and removing the data in the rows that are misaligned, so that the vertical misalignment between the optical axes of the left lens and the right lens can be corrected.

The invention is advantageous in that it is no longer necessary for the imaging system to observe the subject with the binocular eyepiece, i.e. the double eye lens. Moreover, in a standalone system, the stereo video or stereo picture can be synthesized in the synchronous synthesizer and therefore can be compressed and stored, and by the conversion of the stereoscopic display convertor the video or picture can be displayed in naked eye three-dimensional form via a stereo display. In addition, the imaging system can also be connected to a large scale display, and can be incorporated with 2D display functionalities, so as to enhance versatility of the microscope and thus facilitate use of the same.

DETAILED DESCRIPTION OF THE PREFERRED EMBODIMENTS

Figure 1:
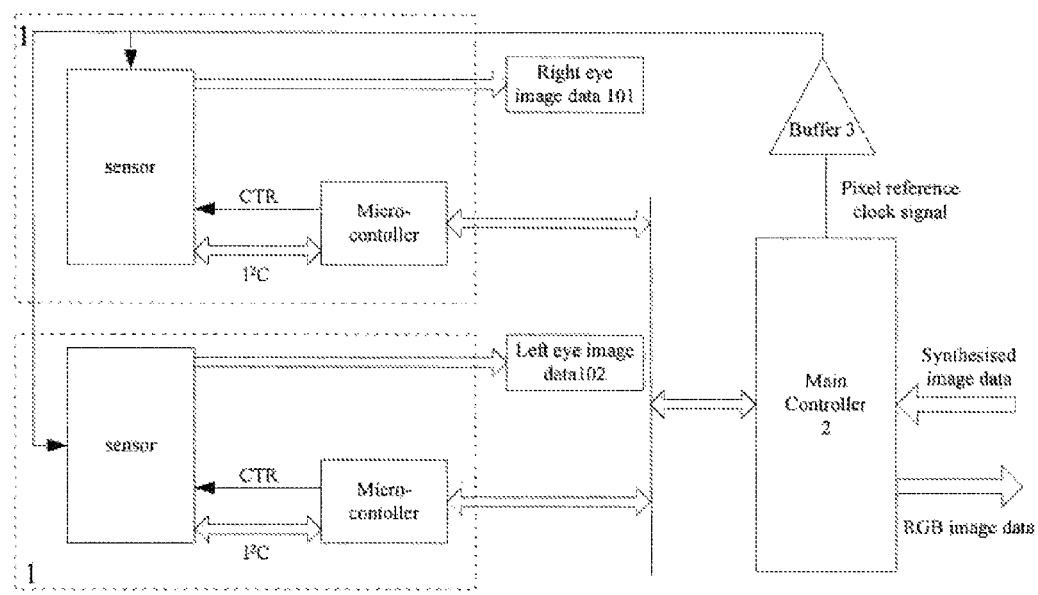
FIG. 1 is a block diagram of an imaging system for a digital stereo microscope having double camera unit arrangement according to an embedment of the invention.

As shown in FIG. 1, an imaging system for a digital stereo microscope according to one embodiment of the invention is illustrated. The system comprises two camera units 1 for the left eye and the right eye of a human being, the two camera units have identical optical magnification and each camera unit 1 is constructed by a lens module, a sensor for capturing imaging and a microcontroller for configuring and controlling the sensor, that is, the imaging parameters, such as brightness and contrast, is adjusted by the microcontroller. Here, as illustrated in FIG. 1, the microcontroller can exchange data, i.e. mostly the imaging parameters, with the sensor via I2C bus, the microcontroller outputs control signal CTR to control the working status, such as start and reset, of the sensor. The two lens modules can be configured such that light passes the two lens modules will converge and focus at one point. The focusing point of lens modules normally lies within the plane of an object support plate and can be adjusted as required. In order to capture a correctly focused image, the focusing point is normally 4 cm to 10 cm below the lens modules, and the optical axes of the two lens modules converge at a point. When observation comfort during restoration of stereo imaging is considered, the included angle between the two optical axes is preferably be configures to be less than or equal to 18 degrees. The angle of 18 degrees is equivalent to observing an object at a distance of 20 cm for a human with ordinary sight, decrease of this distance should be avoided as this may result in approximation of the eye balls which will stain the muscle in the eye call and made the eye fatigue ,whereas an object at a distance of larger than 20 cm can be comfortably observed by a human with ordinary sight, therefore, too small the distance or too big the parallax angle shall both be avoided during stereo imaging since these may result in eye fatigue or may even bring difficulty in restoring the stereo images.

Figure 2:
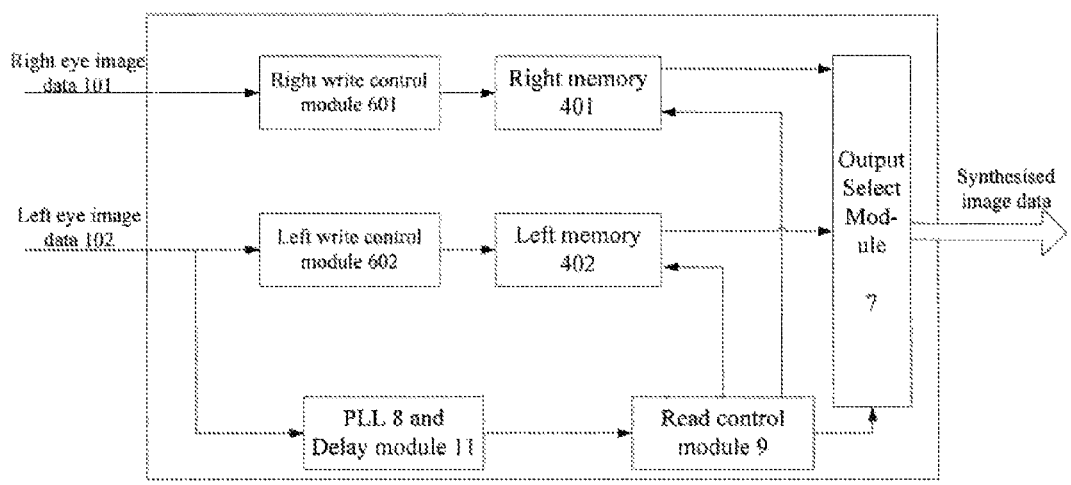
FIG. 2 is a block diagram of the synchronous synthesizer in the imaging system for the digital stereo microscope according to an embedment of the invention.

The imaging system further comprises a main controller 2, e.g. a DSP (digital signal processor), the main controller 2 is communicatively connected to the microcontrollers in the two camera units so as to be able to send instructions to the respective microcontroller. Upon receipt of the instructions from the main controller 2, the microcontrollers will convert them into executable instructions which is then used to control the corresponding sensor, e.g. according to the control of the working status of the sensor, and/or configure the corresponding sensor, e.g. according to the imaging parameters. The main controller 2 may provide a common pixel reference clock signal for outputting image data for both sensors via a buffer 3. An internal phase locked loop (PLL) of the sensor will generate its own pixel reference clock signal on the basis of the system clock. The main controller 2 also provides a common trigger signal for both sensors. Through a synchronous synthesizer as illustrated in FIG. 2, synthesized image data or say parallel image data can be formed by the right eye image data 101 output by the sensor corresponding to the right eye of the human being and left eye image data 102 output by the sensor corresponding to the left eye of the human being with the left eye image data located on the left side and the right eye image data on the right side. The parallel image data is then sent to the main controller 2 by the synchronous synthesizer, where the parallel image data is compressed and encoded as ordinary two-dimensional image to form RGB image data corresponding to the parallel image data.

Figure 3:
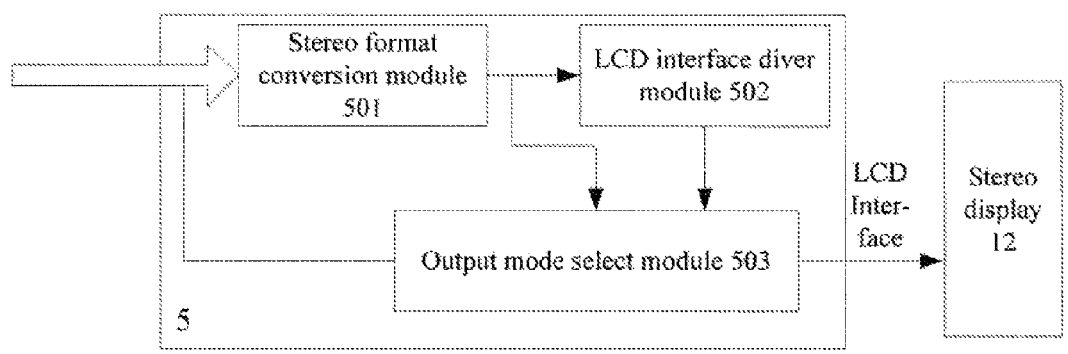
FIG. 3 is a block diagram of a stereoscopic display convertor in an imaging system for a digital stereo microscope according to an embedment of the invention.

The RGB image data is input to the stereoscopic display convertor 5 shown in FIG. 3 for further processing to form a display format the is recognizable by a stereo display 12.

As shown in FIG. 3, the stereoscopic display convertor 5 comprises a stereo format conversion module 501, a LCD interface driver module 502 and an output mode selection module 503. The stereo format conversion module 501 is capable of converting the received parallel format RGB image data into interlaced format RGB image data, e.g. Dot by Dot display format, SUBPIXEL format or checker board format, the conversion module of relevant format will not be elaborated here as they are well known in the art. The RGB image data input into the stereoscopic display convertor 5 is at one hand being transferred to the stereo conversion module 501 for format conversion, and on the other hand, is transferred to a first channel of the output mode selection module 503. The interlaced format image data output by the stereo conversion module 501 is transferred on one hand to the LCD interface driver module 502 and on the other hand to a second channel of the output mode conversion module 503. The output of the LCD interface driver module 502 is input to a third channel of the output mode conversion module 503, all three channels of the output mode conversion module 503 are configured to be selectively electrically connected to the LCD interface of the stereoscopic display convertor 5. Currently, there are three types of available LCD interface driver modules 502, i.e. RGB, CPU and serial SPI. The stereo display 12 is communicatively connected to the stereoscopic display convertor 5 through the LCD interface.

Here, the controller 2 may send chip selection signal to the microcontroller in the respective camera units so that which microcontroller that should execute the instructions of the main controller 2 can be determined. Provision of the chip selection signal facilitates adjustment of the imaging system. In case both microcontrollers are selected, the main controller 2 shall send instructions to the microcontrollers in both camera units. Some parameters of each sensor must be adjusted separately as the sensors may vary in electrical property. As a result, the parameters of the left and the right sensors can be respectively configured utilizing the chip selection signal.

As the two sensors share the same pixel reference clock signal, the two sensors can output raw image data almost at the same time provided that parameters of both sensors are properly configures and they are activated at the same time. However, since each sensor is working independently from the other, precise synchronization of the output image data is hard to achieve even if the control is precise, i.e. maximum time lag of about 0.5 rows always occurs under the same condition.

A synchronous synthesizer according to one embodiment of the invention is shown in FIG. 2. The synchronous synthesizer comprises a left memory unit 402 and a right memory unit 401 arranged for the respective camera units, a right write control module 602 and a left write control module arrange for the right memory unit 402 and the left memory unit 401 respectively; a read control module 9 and a output select module 7. Both the left memory unit and the right memory unit are asynchronous dual-port memories with which the read out process and the write in process can be performed asynchronously. The left eye image data 102 and the right eye image data 101 output by the two sensors are transferred immediately to the left write control module 602 or the right write control module 601 of the synchronous synthesizer and are written into the left memory unit 402 or the right memory unit 401 under control of the left write control module or the right write control module.

Here, the same horizontal and vertical synchronization signals and pixel clock signal as that for the two sensors are used by the left write control module and the right write control module when the write in process is controlled by the left and the right control module, wherein the write control modules act as buffers which progressively writes appropriate volume of image data into the allocated addresses of the memory unit in dependant on the size of the corresponding memory unit. The output selection module 7 is provided to read respective image data from the left or the right memory unit and synthesize the same during the read out process to form parallel image data, the read control module 9 provide horizontal and vertical synchronization signals and pixel clock signal to the output selection module 7 for controlling the read out process, wherein the frequency of the horizontal and vertical synchronization signals for controlling the write in process is same as that of the horizontal and vertical synchronization signals for controlling the read out process (i.e. identical to the frequency of the horizontal and vertical synchronization signal of the respective sensors).

The pixel clock signal for controlling the read out process allows the output selection module 7 reads out one respective row data from both sensors in one row cycle and combine them in a new row, i.e. containing one row data for both sensors in one row cycle for controlling the read out process, thus, the left eye image data 102 and the right eye image data 101 are further attached respectively to the left side and right side of the parallel image data. Full resolution parallel mode or half resolution parallel mode can be implemented during synthesis, in which half resolution parallel mode equivalents to application of a lateral compression to both of the left eye image data 102 and the right eye image data 101. The pixel clock signal for controlling the read out process is dependent on the frequency of the horizontal and vertical synchronization signals for controlling output and the number of pixels in each row, when full resolution parallel mode synthesis is implemented, the frequency of the pixel clock signal for controlling read out is twice of the frequency of the pixel clock of each of the sensors; alternatively when half resolution parallel mode synthesis is implemented, the frequency of the pixel clock signal for controlling the read out process equal to the frequency of the pixel clock of each of the sensors, pixel clock provided by the sensor corresponding to the left eye or to the right eye can be selected directly as required.

The horizontal and vertical synchronization signals of the two sensors are provided via a delay module 11 to the read control module 9, the pixel clock signal is provide through a Phase Locked Loop 8 to the read control module 9 which is configured to generate horizontal and vertical synchronization signals and pixel clock signal according to specific requirements.

As can be learned from the foregoing, the size of the memory unit must be capable of storing at least two rows of image data, wherein one row is to be written in under control of the write control module, and the other row is to be read out under control of the read control module. Due to the buffering effect of the memory unit and the adoption of the sole horizontal and vertical synchronization signals and the pixel clock signal, synchronization of the image signals is achieved and synthesis can be finished when they are read out by the output selection module 7.

Worth to mention is that it is possible for the output selection module 7 to read out only the left eye image data or only the right eye image data under control of the read control module 9 in order to merely realize two-dimensional display.

Since there are horizontal parallax between the two camera units, and even same parallax may result in different feelings on different display devices, moreover, tolerance to parallax are independent from one observer to the other, therefore, in order to provide the user with comfortable stereo image perception, the parallax needs to be regulated. In this invention, the regulation of the parallax is achieve by selectively read out the row image data, specifically, different starting point and end point of the row data to be read out from the two memories are selected by the output selection module 7 in one row cycle.

In addition, it is preferable that the optical axes of the two camera units are arranged substantially in a same horizontal plane during assembly such that vertical parallax between the image data output by the two sensors can be substantially avoided. This however brings high requirements on the assembly precision of components. As a solution, in addition to the mechanical-optical adjustment, fine adjustment realized by electronics may also be a supplement. During vertical parallax adjustment, vertical alignment can be achieved by removing the whole start row or the whole end row of the image data. Here, the maximum scope of vertical movement is determined by the maximum size of the respective memory unit, e.g. if a memory unit can store only ten (10) rows of image data, only ten (10) rows of upwards or downwards movement, i.e. relatively twenty (20) rows movement, can be achieved during the read out process of the output selection module 7. After the vertical parallax is eliminated, the unaligned portions of the images are all removed. As a result, partial compression is applied to the vertical field of the image.

The image system can be improved by providing a memory card that is communicatively connected to the main controller 2. Additionally or alternatively, the main controller 2 can be configured to be communicatively connected to a SD card reader module, a USB controller module, a TV module and/or a HDMI interface module.

It is intended that the scope of the disclosure be limited not by this detailed description, but rather by the claims of this application. As will be understood by those familiar with the art, the present disclosure may be embodied in other specific forms without departing from the spirit or essential characteristics thereof.

What is claimed is:

1. An imaging system for digital stereo microscope comprising:
    two camera units with the same optical magnification arranged respectively for the left eye and the right eye of a human being, each camera unit comprising:
        a lens,
        a sensor for imaging, and
        a microcontroller for controlling and configuring the sensor, wherein the two lenses of the two camera units are focused below the lens and optical axes of both lenses and are arranged to focus at a same point;
    a main controller which is configured to send instructions to the respective microcontrollers for configuring and controlling the sensor arranged for each microcontroller, and to provide both sensors with a common trigger signal for outputting image data and a common pixel reference clock signal for each sensor to generate its own pixel clock signal;
    a synchronous synthesizer for generating synthesized image data with left eye image data located on the left side and the right eye image data located on right side by synchronizing and synthesizing the left eye data and the right eye image data output by the respective sensor, the synthesized image data compressed and encoded in the main controller to generate RGB image data corresponding to parallel image data;
    a stereo display that receives and displays image data; and
    a stereoscopic display convertor for receiving the RGB image data and converting the received RGB image data into a format that is recognizable by the stereo display.

2. The system according to claim 1, wherein the included angle between the two optical axes is equal to or less than 18 degrees.

3. The system according to claim 1, wherein the stereoscopic display convertor comprises a stereo format convert module for converting the received RGB image data into an interlaced format;
    wherein an output of the stereo format convert module is electrically coupled to a LCD interface of stereoscopic display convertor; and
    wherein the stereo display is communicatively connected to the stereoscopic display convertor via the LCD interface.

4. The system according to claim 1, wherein the stereoscopic display convertor includes a stereo format convert module for converting the received RGB image data into an interlaced format and a LCD interface driver module, the image data in the interlaced format generated by the stereo format convert module can be input to the LCD interface driver module;
    wherein an output of the LCD interface driver module is electrically coupled to the LCD interface of the stereoscopic display convertor.

5. The system according to claim 1, wherein the main controller provides a chip selecting signal to the microcontroller in each of the camera units to select the microcontroller that is to execute the instructions of the main controller.

6. The system according to claim 1, wherein the synchronous synthesizer comprises:
    two memory units, a left memory unit and a right memory unit, arranged for the respective camera unit;
    two write control modules, a left write control module and a right write control module, arranged for the respective memory unit;
    a read control module; and
    an output selection module;
    wherein the left memory unit and the right memory unit are both asynchronous double port memory that can perform read out and write in operation asynchronously;
    wherein the left eye image data and the right eye image data output by the sensors are transferred to the left eye write control module and the right eye write control module respectively and are then written at the control of the left eye write control module or the right eye write control module into the respective left memory unit or the right memory unit;
    wherein horizontal and vertical synchronization signals and the pixel clock signal provided by the left write control module and the right write control module are identical to respective horizontal and vertical synchronization signals and the pixel clock of the two sensors;
    wherein the left eye image data and right eye image data are read out by the output selection module from the left memory unit and the right memory unit and are synthesized during the read out process to form a synthesized image data;
    wherein in this process, the read control module provides the output selection module with the horizontal and vertical synchronization signals and the pixel clock that is of the same frequency as the horizontal and vertical synchronization signals and pixel clock for controlling the write in process, and the pixel clock for controlling the read out process is configured to allow the output selection module to read out one row of data from each of the sensors and synthesize them in a new data row within one row cycle for controlling the read out process.

7. The system according to claim 6, wherein the synthesized image data is generated through full resolution parallel synthesis by the output selection module under control of the read control module;

wherein the frequency of the pixel reference clock signal for controlling the read out process is twice the frequency of the pixel clock signal of the sensor for the left eye or the right eye.

8. The system according to claim 6, wherein the synthesized image data is generated through half resolution parallel synthesis by the output selection module under control of the read control module;

wherein the frequency of the pixel reference clock signal for controlling the read out process equals to the frequency of the pixel clock single of the sensor for the left eye or the right eye.

9. The system according to claim 6, wherein the horizontal and vertical synchronization signals of a sensor are input to the read control module through a delay module to generate the horizontal and vertical synchronization signals for controlling the read out process at the read control module.

10. The system according to claim 6, wherein the output selection module read out, within a row cycle for controlling read out, the rows to be read out in the left memory unit and the right memory unit from at least a different start point or an end point to eliminate horizontal parallax between the left eye image data and the right eye image data.

11. The system according to claim 6, wherein the synthesized image data is generated through full resolution parallel synthesis by the output selection module under control of the read control module;

wherein the pixel clock signal of the sensor is input to the read control module via a phase locked loop and the pixel clock for controlling the read out process is generated as a result.

12. The system according to claim 6, wherein the horizontal parallax between the left eye image data and the right eye image data output by the respective camera unit is adjusted by the output selection module during read out by reading out the required rows from the left eye image data and the right eye image data and removing the data in the rows that are misaligned, so that the vertical misalignment between the optical axes of the left lens and the right lens can be corrected.

* * * * *